United States Patent Office 2,768,487
Patented Oct. 30, 1956

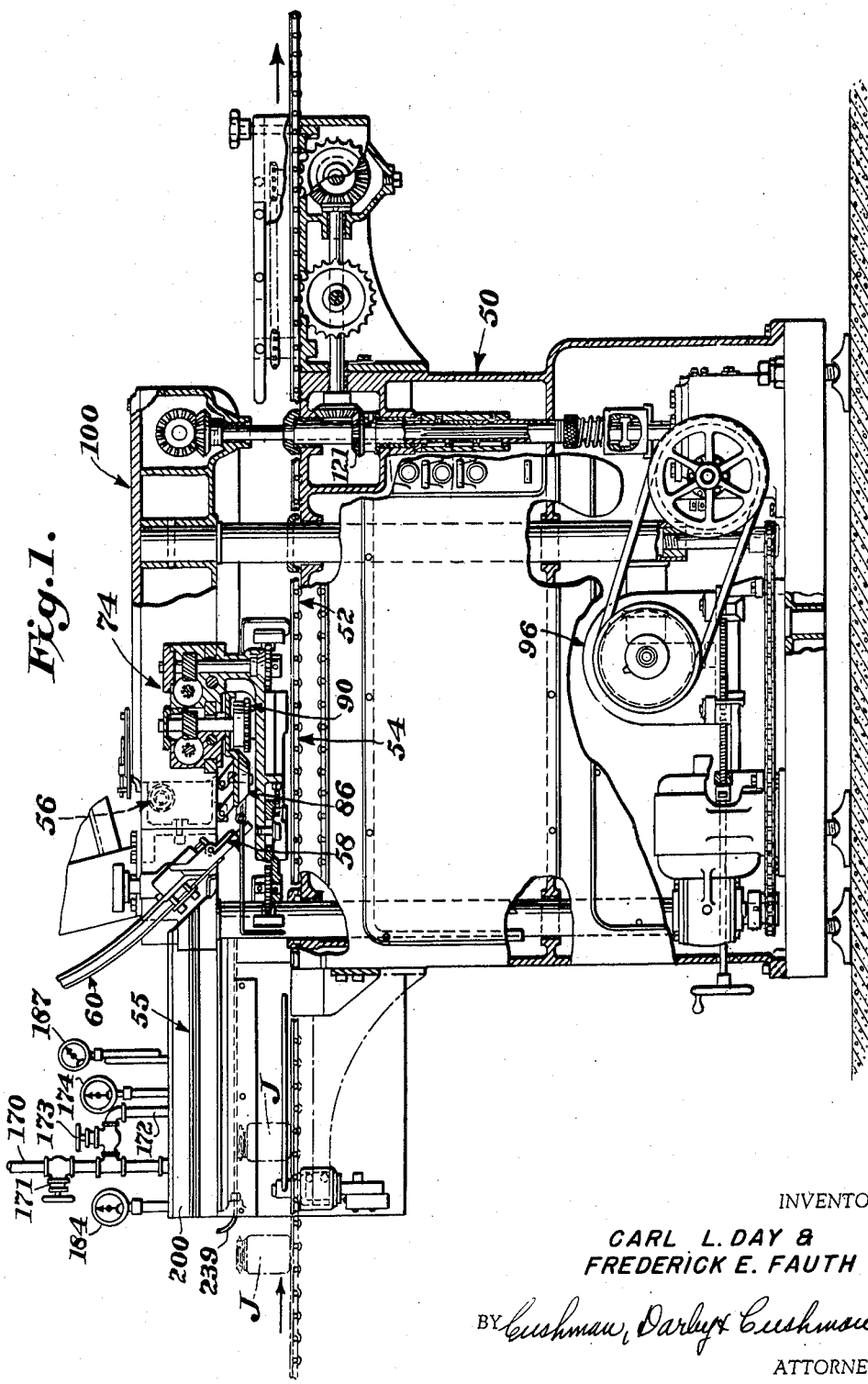

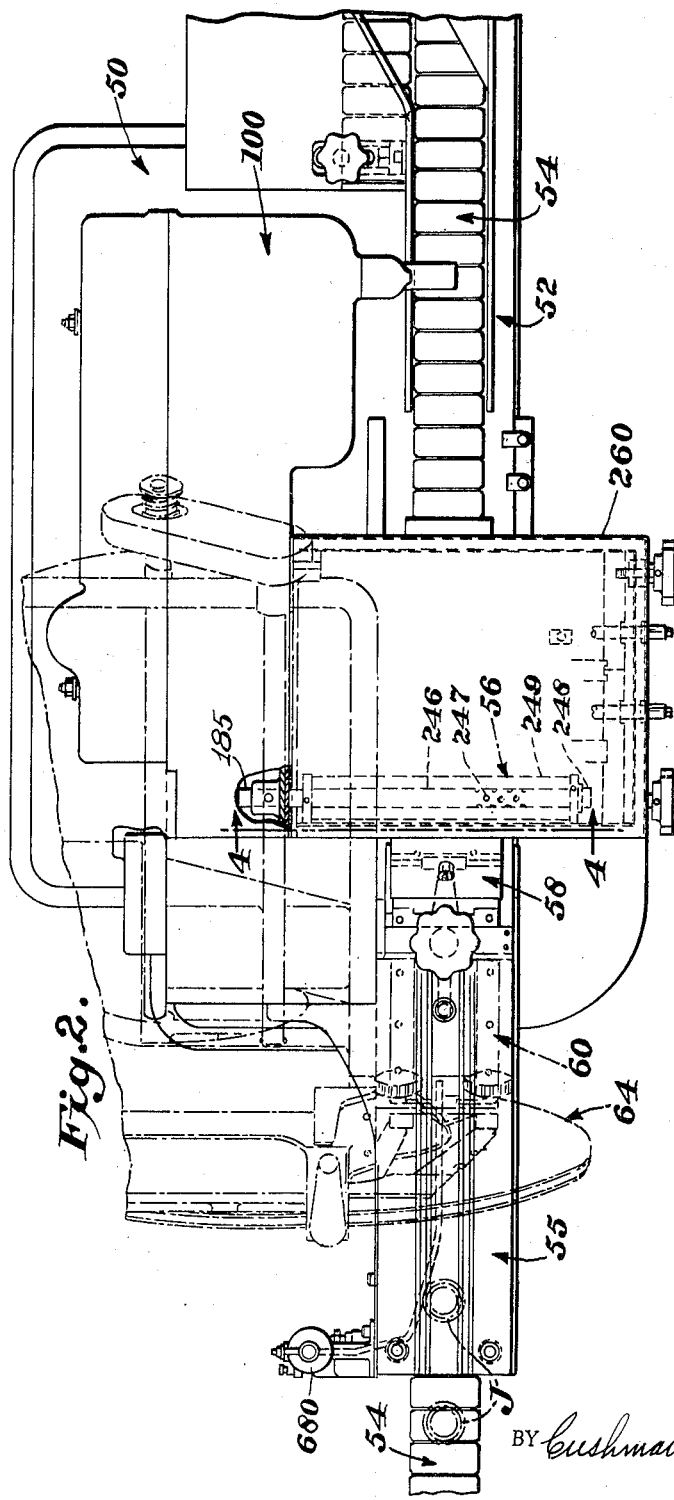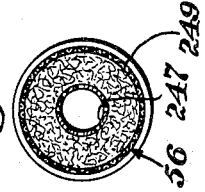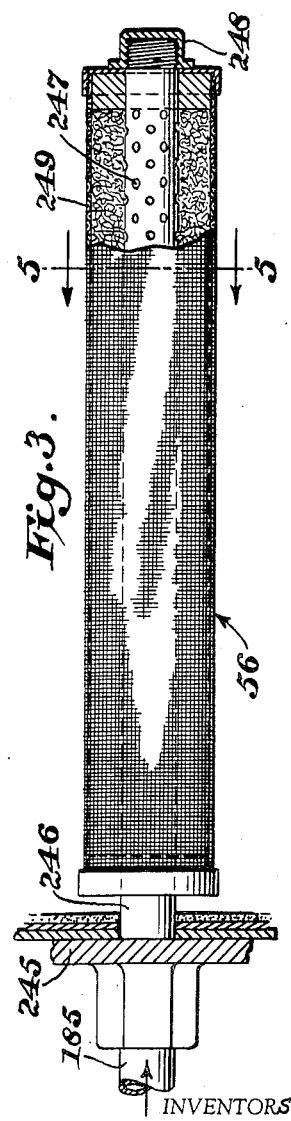
INVENTORS:
CARL L. DAY &
FREDERICK E. FAUTH
BY Cushman, Darby & Cushman
ATTORNEYS.

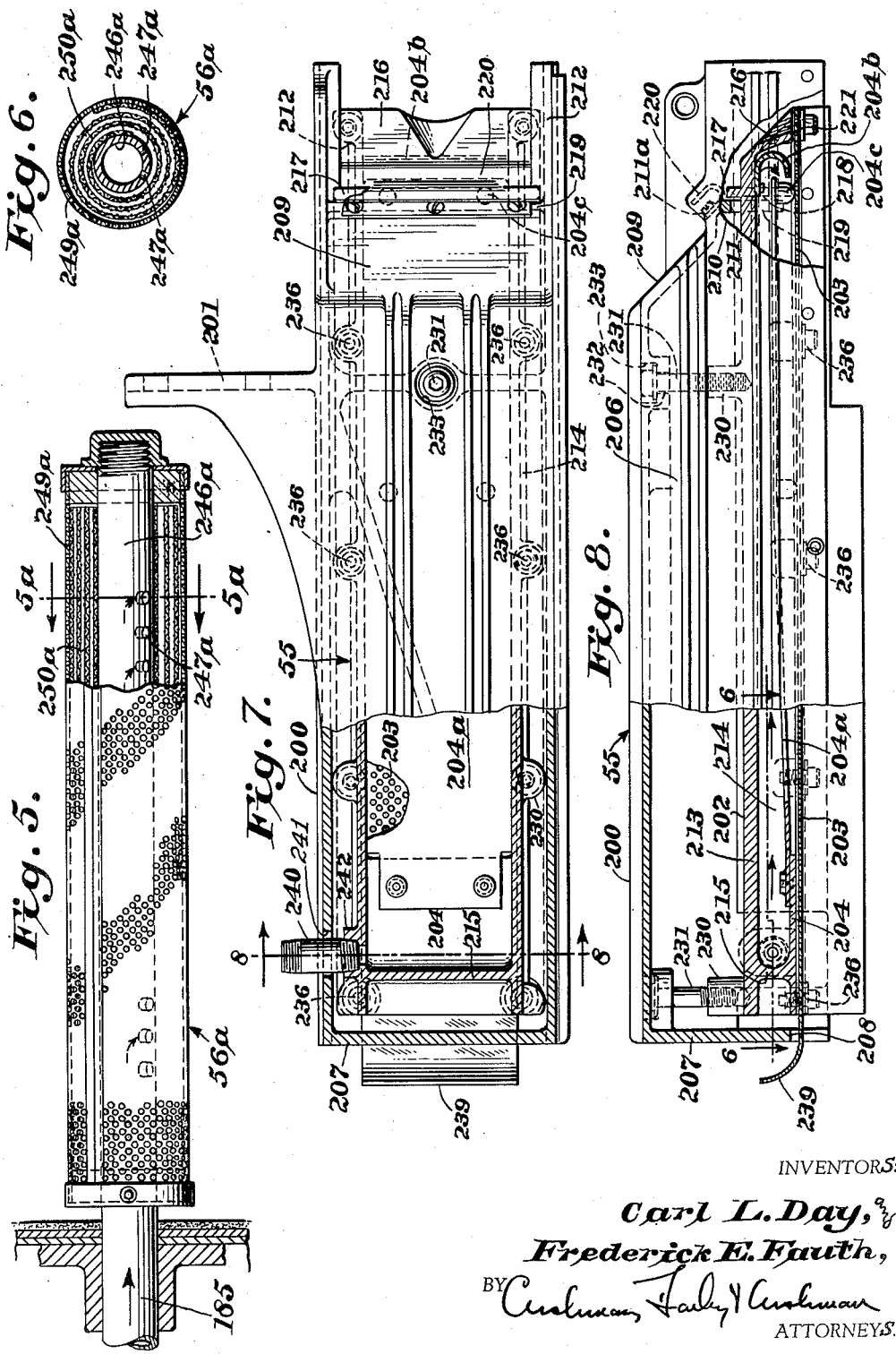

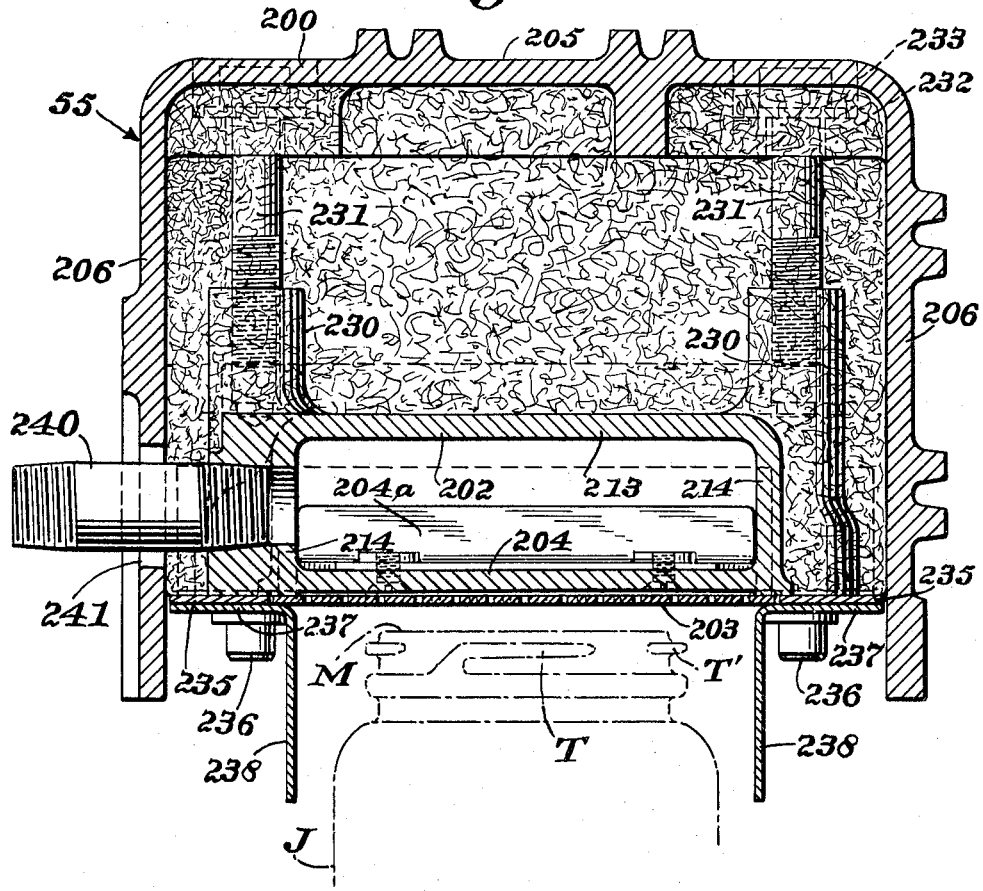

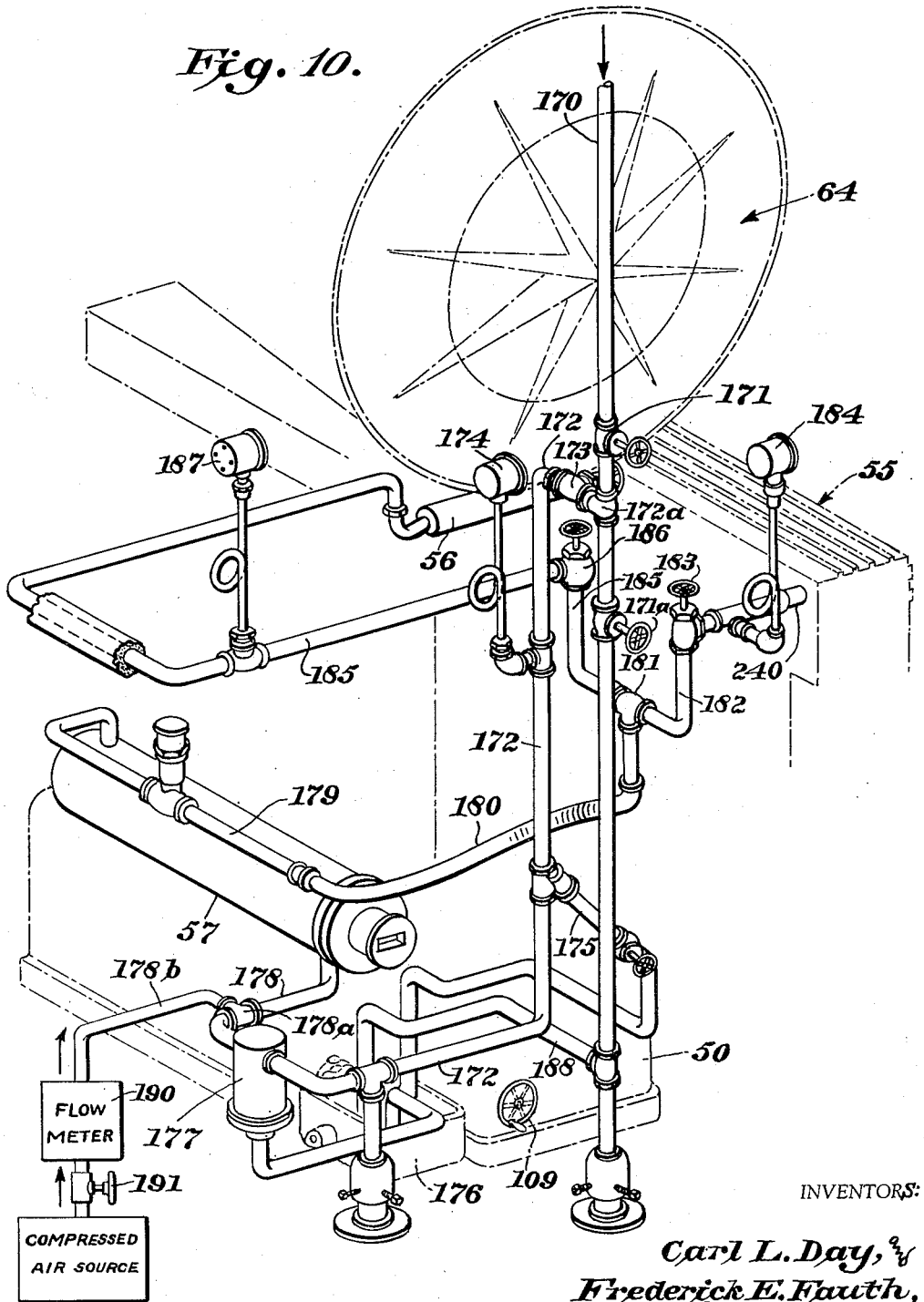

2,768,487

METHOD AND APPARATUS FOR SEALING CONTAINERS

Carl L. Day and Frederick E. Fauth, Baltimore, Md., assignors to Crown Cork & Seal Company, Inc., Baltimore, Md., a corporation of New York Original application June 23, 1952, Serial No. 295,024. Divided and this application January 20, 1954, Serial No. 405,194

13 Claims. (Cl. 53—11)

The present invention relates to a method and apparatus for sealing containers and, more particularly, to a method and apparatus for replacing the air in and treating the headspace of a filled container and sealing the same.

This application is a division of application Serial No. 295,024, filed June 23, 1952, which discloses apparatus for securing threaded caps to containers. Although the present invention is particularly adapted for use with apparatus of the above-mentioned application, it is of course within the scope of the invention to use any type of cap securing means with the method and apparatus of the present invention.

Numerous machines heretofore have been proposed for applying steam or the like to the headspace of containers and sealing the containers, but such prior machines have not been of optimum efficiency in the treating of the headspace of containers which are moving at high speeds on a conveyor line.

Therefore, an object of the present invention is to provide a method and apparatus for replacing the air in the headspace of a filled container with steam or the like and sealing the container while the containers are moving rapidly on a conveyor.

Still another object of the present invention is to provide an apparatus including arrangements to replace air in the headspace of a filled container with steam or an inert gas or a controlled mixture of steam and gas, the means being of such design as to provide a diffused atmosphere of steam or gas through which the headspace of the container will move.

A further object of the present invention is to provide an apparatus which will maintain a diffused atmosphere of steam or the like about the head of a container while the container is being sealed.

Still another object of the present invention is to provide a steam chamber of such arrangement that a diffused atmosphere of steam or gas will flow countercurrent to the direction of travel of the filled container.

Other objects and advantages of the invention will be apparent from the following specification and accompanying drawings.

Figure 1 is a view partly in front elevation and partly in vertical section of an apparatus constructed in accordance with the invention, the view omitting most of the upper portion of the cap feeding mechanism.

Figure 2 is a plan view of the structure shown in Figure 1, the view including in dot-and-dash showing the steam diffuser.

Figure 3 is a detail elevation of the steam diffuser on the line 4—4 of Figure 2, the view being partly in central section.

Figure 4 is a vertical sectional view on the line 5—5 of Figure 3.

Figure 5 is a view similar to Figure 3 but showing a modified form of steam diffuser.

Figure 6 is a vertical sectional view on the line 5a—5a of Figure 5.

Figure 7 is a top plan view of the steam tunnel illustrated in the upper left-hand portion of Figure 1 and also at the left-hand portion of Figure 2, the view being partly in horizontal section on the line 6—6 of Figure 8.

Figure 8 is a side elevation of the steam tunnel, portions being illustrated in central vertical section.

Figure 9 is a transverse section on the line 8—8 of Figure 7, the view also including a dotted line showing of a container moving through the steam tunnel.

Figure 10 diagrammatically illustrates the steam piping of the machine.

*General description*

The construction and operation of the machine illustrated in the application as embodying the invention generally may be described as follows: Referring to Figure 1, the apparatus includes a body casing or housing 50 including an upper surface or work table 52 across which the top run of a straight line conveyor 54 moves jars J or other containers from the left to the right of the figure. The containers J will first pass through a steam tunnel 55 so that at least a substantial portion of the air within the headspace of the container will be displaced by steam. If desired, an inert gas, steam and heated air, or steam alone, may be flowed into the headspace of the container during movement through tunnel 55. Whatever fluid is used may be delivered to tunnel 55 and to a diffuser 56 adjacent the tunnel exit through suitable piping. If a fluid including steam is used, it will be delivered through the piping shown in Figure 10 which includes an electrically heated superheater 57.

After the jar J leaves steam tunnel 55, a cap C provided with thread engaging lugs L will be loosely applied to the container by a cap applying mechanism having a cap applying element 58 which receives the caps from a chute 60. The cap applying mechanism which is positioned above conveyor 54 may be of the type as shown in application Serial No. 405,195, filed herewith, which is also a division of application Serial No. 295,024, filed June 23, 1952. Of course, it is well within the scope of the present invention that a cap applying mechanism other than that shown in the above-mentioned application may be used with the apparatus and method of this particular application.

After the cap C has been applied loosely to the container J, the container and cap will be transferred beneath a cap securing mechanism 74 which will include a cap presser 76, cap unthreading rollers 86 and cap threading rollers 90. The cap securing mechanism 74 disclosed in the instant application is of the type as disclosed in application Serial No. 295,024, filed June 23, 1952, of which this application is a division. It is within the scope of the present invention that other means of securing the cap to the container can be used with the present invention of removing the headspace air from filled containers, inserting a gas, steam and heated air, or steam, into the headspace of the container and then sealing the containers.

After the container J has passed through steam tunnel 55 where the headspace air is removed and steam is inserted into the headspace, the container will have a cap applied and secured in an atmosphere of diffused steam coming from the diffuser 56. After the container having its headspace filled with steam or the like has had a cap secured thereto, the steam will cool and condense shortly after the container leaves the securing mechanism 74. Hence, a low pressure condition will exist in the container. If an inert gas is flowed into a container, such gas will be sealed therein by the securing and sealing of the cap on the container.

Steam supply

The piping system whereby steam is supplied to the tunnel 55 is best illustrated in Figure 10. Referring to that figure, steam is delivered at a pressure of from 15 to 125 pounds to the apparatus through the vertical line 170 shown extending downwardly in Figure 10. A main steam shut-off valve 171 is provided in line 170 at a convenient height and a line 172 is connected to line 170 by a fitting 172a immediately beneath valve 171. A second shut-off valve 173 is connected in line 172 closely adjacent line 170. The portion of line 170 below branch 172 has a valve 171a therein and is connected to clean out lines which can be operated when valve 171a is closed.

Line 172 has a gauge 174 connected thereto and the lower portion of line 172 has a clean-out branch 175 connected thereto which leads to a catch basin 176. Below clean-out line 175, line 172 extends horizontally to a separator and trap 177 from which a line 178 extends to the electrically heated superheater 57. The superheater 57 may be controlled by thermostats, not shown, having its bulb positioned in the upper portion of the housing 260 shown in Figure 2, the control being such that a temperature corresponding to 8° to 50° of superheated steam is maintained in the capping area and in the area of tunnel 55 in which air is removed from the container headspace. Superheater 57 also may be provided with a top limit thermostatic control to shut it off if its temperature becomes too high. As a typical setting, the thermostat controlled by the bulb in the capping area may maintain 230° in that area when the superheater is operating at 450°.

If desired, a fitting 178a can be provided in line 178 of Figure 10 to permit compressed air or other dry gas to be admitted from a line 178b for mixture with the steam entering superheater 57 to control the degree of vacuum to be obtained in the sealed containers. From superheater 57, a line 179 including a flexible portion 180 extends to a three-way fitting 181, one branch 182 from fitting 181 extending to the steam tunnel 55 past a valve 183 and a back pressure gauge 184. The other branch 185 includes a shut-off valve 186 and then extends to the diffuser 56. Branch 185 has a gauge 187 therein.

The extreme lower portion of infeed line 170 is connected to the catch basin 176 by a line 188.

Referring in more detail to the matter of mixing compressed air to the steam delivered to superheater 57, the purpose of this method is as follows: If it is desired to establish a vacuum of a certain order in containers, it usually is necessary to maintain a certain volume of steam in tunnel 55 and housing 260. However, reliance upon the cooling of steam, alone, to create a low headspace pressure can result in too great condensation of moisture within the headspace and upon the product. Furthermore, if the volume of steam in tunnel 55 and housing 260 is reduced to obtain a lesser degree of vacuum in the containers, air may enter the tunnel 55 or housing 260 to thereby disperse the steam so that a vacuum of less efficiency than desired results and the vacuum effect in containers will vary.

Referring to Figure 10, in order to overcome the above difficulties, we supply compressed air through line 178b to line 178 from a suitable source, and at a higher pressure than the steam pressure so that the air will move into superheater 57 to be sterilized and heated to reduce its condensing action on the steam. The compressed air will move in line 178b through a flow meter 190 so that its volume will be measured. A valve 191 positioned adjacent the inlet of the flow meter may be operated to regulate or control the delivery of compressed air to the flow meter. Thus, flow meter 190 can be controlled to provide compressed air at a given cubic footage per hour depending upon the final vacuum to be provided in the container headspace.

While mixture of air with the steam generally will reduce the final vacuum obtained, it frequently is not necessary to have an extremely high vacuum in the container headspace, particularly when the vacuum is not relied upon to hold the cap upon the container and, in any event, the avoidance of moisture which can be obtained by use of heated air and steam almost always is desirable. If desired, a dry gas other than air may be mixed with the steam as described above.

Steam tunnel

Steam tunnel 55 is best illustrated in Figures 1, 2 and 7 to 9, the last-mentioned figures showing the internal form of the tunnel. It will be observed from Figure 9 that the exterior housing 200 of tunnel 55 is generally of inverted U-shape in transverse section. The casting of which outer housing 200 is formed includes a lateral extension 201 illustrated in Figure 7 and by means of which the tunnel is secured to the superstructure 100 of the apparatus. Tunnel 55 may have a length of about two feet, the cap applying device 58 associated with chute 60 being immediately adjacent the outfeed end of the tunnel as shown in Figure 1. As is indicated in Figures 7 and 8, the outfeed end of housing 200 is suitably inclined to accommodate the lower end of chute 60 and the cap applying device 58.

As indicated in Figures 8 and 9, the lining casting 202 of tunnel 55 forms the upper wall of the steam inlet chamber. The lower wall of the steam inlet chamber is defined by a horizontally arranged perforated plate 203 which will be positioned closely adjacent the mouth of the containers J though, as shown in Figure 8, a web 204 integral with casting 202 forms the lower wall of the steam inlet chamber in the area adjacent the steam inlet pipe 215 and the container infeed end of the tunnel.

As best shown in Figure 8, an imperforate plate 204a has one end secured to the upper surface of web 204 and then extends slightly upwardly to a point within a downwardly curved deflector 204b at the opposite end of liner 202, the free end of plate 204a including downwardly projecting and spaced lugs 204c which bear upon the upper surface of perforated plate 203 to hold that end of plate 204a midway between perforated plate 203 and the top wall of liner 202. By this arrangement, steam entering liner 202 will flow to the right in Figure 8 above plate 204a, be deflected downwardly by deflector 204b and then move along above perforated plate 203 and move through its apertures into tunnel 55 countercurrent to the travel of the containers.

Considering tunnel 55 in more detail, the outer housing 200 includes a top wall 205 and vertical side walls 206, both of which are parallel with the front of the machine. As is best shown in Figure 8, at the inlet end of the tunnel, the walls 206 are joined by a vertical wall 207 which has its lower edge 208 positioned slightly above the lower edges of the side walls 206 and also slightly above the plane in which the perforated plate 203 lies. At the outlet end of the tunnel, the side walls 206 are joined by an end wall 209 having its upper portion inclined to conform to the cap chute 60 and having a short lower portion 210 which is vertical and terminates at 211 to enable the upper wall of the liner 202 to lie slightly below the same. The wall portions 209 and 211 are joined by a portion 211a which is inclined to lie parallel to portion 209. As shown in Figure 7, the side walls 206 extend past the wall 209 as indicated at 212, the extensions 212 thereby lying alongside the cap applying element 58 with a view of preventing escape of steam between the tunnel 55 and the cap applying element 58.

The liner element 202 includes a top wall 213 and side walls 214. At the infeed end of the tunnel, the side walls 214 are joined by an end wall 215 and the cross web 204. At the outlet end of the tunnel, liner 202 includes an inclined end wall 216 to lie beneath the cap applying element 58 and between the extensions 212 of the outer housing. Adjacent end wall 216, liner 202 includes an upstanding flange 217 adapted to lie against the outer vertical surface of the short vertical wall 210 of the outer housing. Flange 217 continues down along the exterior of the liner side walls 214 as shown at 218 in dotted lines to thereby be adjacent inwardly projecting flanges 219 on housing 200 and below end wall 210. As is indicated at the right-hand portion of Figure 8, a flexible bowed sealing element 220 may be secured to the wall 211a to thereby form a seal with the adjacent cap applying element 58. The lower edge 221 of end wall 216 lies in the same plane as the lower edges of the side walls 214 and the inlet end wall 215. Deflector 204b is secured to the liner top wall 213 immediately adjacent the inclined end wall 216.

The lining 202 of tunnel 55 includes upwardly projecting threaded bosses 230 best illustrated in Figure 9 in which headed bolts 231 are threaded, the bolts extending upwardly through apertures 232 in the top wall 205 of outer housing 200, with the heads of the bolts resting upon washers which bear upon recesses 233 in the top wall of the housing. Figure 9 indicates two bolts 231 at the outlet portion of tunnel 55. However, as shown in Figure 7, if desired, only one bolt 231 need be provided. The space between the liner 202 and the outer housing 200 will be filled with glass wool or other suitable compressible heat insulating material. This filling is shown only in Figure 9.

The lower portion of the space between the liner 202 and the side walls 206 of the outer housing 200 is closed by strips 235 secured to the lower edges of liner 202 by machine screws 236. The machine screws also support right angled members 237 including vertical strips 238, the strips 238 extending sufficiently far downwardly and in such alignment with the inner wall of liner 202 to enclose the upper portions of the containers J. The members 237 include slots engaged by the machine screws 236 so that the members 237 may be adjusted toward each other when relatively small containers are being handled in the tunnel 55.

The perforated plate 203 is supported between the lower edge of the liner 202 and the strips 237 as shown in Figure 9, the plate extending the entire length of the tunnel as indicated in Figure 8. Plate 203 preferably is formed of stainless steel and may have a thickness of .03 inch. In a typical installation, plate 203 will be provided with apertures .06" in diameter staggered on centers 3/32 of an inch apart to provide approximately 126 apertures per square inch. It has been indicated above that plate 203 may be twenty-four inches long. It usually will be four inches wide. Under these circumstances, two hundred containers of sixteen ounces capacity may be handled per minute by the tunnel 55. As is best shown in Figures 1 and 7, perforated plate 203 is provided at its infeed end with a curved handle portion 239 by means of which it readily can be withdrawn from the tunnel for cleaning.

Steam at a temperature above 212° F. will be supplied to the tunnel 55 through the steam inlet fitting 240 connected to steam line 182. Fitting 240 extends through a vertical slot 241 in outer housing 200 and has its inner end threaded in a boss 242 of liner 202 so that the inner end of the fitting 240 opens laterally to the space provided in liner 202 above web 204. Steam thereby enters the infeed end of the steam inlet chamber but is baffled by web 204 and plate 204b so that it cannot flow directly through the perforated plate 203. Hence, the steam entering the steam inlet chamber of the tunnel will move the entire length of the tunnel and then move downwardly and countercurrent to the container travel through the perforations in plate 203. The small size of the perforations, taken with the fact that the steam enters the tunnel laterally, will result in providing a diffused body of steam in the space between the strips 238.

The lower surface of the perforated plate 203 normally will be about ¼ of an inch above the lip M of a container J so that the steam between the strips 238 readily will flow into the headspaces of the containers to replace at least the greater portion of the air in the container headspaces. If an inert gas is supplied to the tunnel, it similarly will displace headspace air.

The fact that the steam enters the tunnel in a direction opposite to that in which the containers move prevents air from being drawn into the tunnel by the movement of the containers.

It will be observed that the bolts 231 which support the liner 202 actually are hangers freely vertically movable through the apertures 232 of the housing 200. Therefore, if a container J falls over while moving through the tunnel, with the result that one portion of the container lip M rises to contact with the perforated plate 203, plate 203 and liner 202, together with the bolts 231, may rise with respect to the tunnel, thereby preventing the tilted container from being jammed between the container supporting conveyor 54 and the undersurface of the perforated plate 203. This arrangement permits close spacing of the perforated plate 203 with respect to the container mouths but without operating difficulties.

*Steam diffuser*

The construction of one form of diffuser 56 to supply steam to the area immediately adjacent and beyond the cap applying element 58 is illustrated in Figures 3 and 4. As is indicated in those figures and Figure 2, the steam supply line 185 leading to the diffuser 56 extends through a depending flange 245 on the superstructure 100. A pipe or tube 246 extends forwardly and horizontally from the line 185 and adjacent and above the cap applying element 58. Tube 246 is provided with a plurality of closely spaced perforations 247 and is closed at its forward and outer end by a cap 248. A wire screen 249 of tubular form surrounds and is spaced from the tube 246 by collars, the space between the tube and wire screen being filled with steel wool. The presence of the steel wool in association with the perforations and the wire screen 249 causes steam flowing from tube 246 to be thoroughly diffused in the area in which a cap C is moved from the inclined position to a substantially horizontal position. In addition, diffuser 56 will cause some steam to be present throughout the area occupied by the cap securing mechanism 74.

Figures 5 and 6 illustrate a preferred form of diffuser 56a. In this form, the tube 246a to which steam supply line 185 extends is provided with two rows of downwardly facing apertures 247a and a second perforated tube 249a surrounds and is spaced from tube 246a by end collars. The space between the inner tube 246a and outer tube 249a contains a fine screen indicated at 250a, the screen being of sheet form and loosely wrapped about tube 246a as indicated in Figure 5. The apertures 247a of inner tube 246a may be in two rows as shown in Figure 6 so as to face downwardly. The holes 247a may be 5/32" diameter and spaced ½" apart in the rows. Screen 250a may be of wire mesh cloth provided with .015" openings. The openings in outer tube 249a may be .06" holes spaced on 3/32" centers to provide about one hundred twenty-five holes to the square inch.

The presence of the fine screen in association with the apertures 247a in inner tube 246a and the apertures in outer tube 249a causes steam to be thoroughly diffused in the cap applying and securing area.

It will be observed from Figure 2 that a removable housing 260 supported on superstructure 100 and lying immediately adjacent cap applying mechanism 58 covers the cap securing mechanism 74. Housing 260 may be lined with heat insulating material and includes depending walls to enclose and shield the space adjacent the mechanisms 58 and 74 from drafts so that steam will be present in that space to minimize the possibilities of air entering a container headspace before it is sealed.

As has been indicated above, a thermostat bulb may be positioned in the top central portion of the area enclosed by housing 260 to thereby control the superheater 57.

As a result of the steam supply structures described above, the headspace of each container as well as the caps will be filled with steam before the cap actually is applied to the container. Moreover, the action of securing a cap to a container will be preformed in a steam atmosphere. Therefore, after the sealed container with its headspace filled with steam moves to a cooler atmosphere on conveyor 54 beyond housing 260, the steam within the headspace will condense to thereby create a vacuum condition in the container.

The terminology used in this specification is for the purpose of description and not for limitation as the scope of the invention is defined in the claims.

We claim:

1. In a container sealing apparatus, a container conveyor, container sealing means, a tunnel provided above said conveyor forward of said container sealing means, said tunnel including a top wall and depending side walls, a fluid inlet positioned adjacent the inlet end of the tunnel, a web extending between the side walls and below the fluid inlet, and a horizontally arranged perforated plate extending between the side walls and below the web.

2. A container sealing apparatus of the character described in claim 1 including longitudinally extending slideways opening to one end of the tunnel to support said perforated plate for slidable removal lengthwise of the tunnel, said perforated plate having means thereon extending out of said tunnel.

3. In a container sealing apparatus, a frame, a container conveyor, container sealing means, a tunnel provided above said conveyor forward of said container sealing means, said tunnel comprising an outer housing of inverted U-shape in transverse section to include a top wall and depending side walls, said outer housing being fixed to said frame, a liner also of inverted U-shape in transverse section to include a top wall and depending side walls, means adjustably connecting said liner to said outer housing to support said liner within the lower portion of said outer housing for vertical upward and downward movement with respect to said outer housing and said conveyor, a body of compressible heat insulating material positioned between the housing and liner, said body of insulating material being compressed when said liner is moved upwardly and expanded when said liner is moved downwardly, means to deliver fluid to said liner, and a horizontal screen mounted between the side walls of said liner.

4. A container sealing apparatus of the character described in claim 3 wherein said means to support said liner comprises hangers depending from the top wall of said housing so that said liner may move upwardly and downwardly with respect to said housing.

5. In a container sealing apparatus, a container conveyor, container sealing means, a tunnel provided above said conveyor forward of said container sealing means, means to deliver fluid under pressure to said tunnel adjacent its inlet end, a perforated horizontally disposed plate positioned between the fluid inlet and the conveyor, and means positioned between said perforated plate and the means to deliver steam for directing fluid from the perforated plate in a direction opposite to that in which the conveyor moves.

6. In a container sealing apparatus, a source of steam, a means to deliver steam to the headspaces of filled containers before the containers are sealed, a steam supply line connecting said means to said source of steam, and means to deliver compressed air to the steam in said supply line between said means and said source of supply so as to control the steam's condensing characteristics.

7. In a container sealing apparatus, a container moving means, cap applying means above said first-named means, means to enclose the cap applying means and the portion of the container moving means at the infeed side of the cap applying means, means to deliver heated fluid to said enclosing means and temperature responsive means within said enclosing means, said temperature responsive means being operatively connected to said heated fluid delivery means to control the temperature of the heated fluid delivered thereby to said enclosing means.

8. The method of creating a vacuum condition within a filled container headspace comprising mixing heated dry gas and steam, then subjecting the unsealed filled container to the mixture of heated dry gas and steam and then sealing the container.

9. A method of the character described in claim 8 wherein the dry gas and steam are superheated together prior to subjecting the mixture to the filled container.

10. A method of the character described in claim 8 wherein the dry gas is compressed to a pressure higher than that of the steam and before mixture with the steam.

11. A method of the character described in claim 8 wherein a measured quantity of dry gas is mixed with the steam.

12. A method of the character described in claim 8 wherein the dry gas is air.

13. In a container sealing apparatus, a source of steam, a means to deliver steam to the headspace of filled containers before the containers are sealed, a steam supply line connecting said means to said source of steam, and means to deliver compressed air to the steam in said supply line between said means and said source of supply so as to control the steam's temperature.

References Cited in the file of this patent

UNITED STATES PATENTS

| Number | Name | Date |
|---|---|---|
| 1,920,539 | White | Aug. 1, 1933 |
| 2,107,237 | Davies | Feb. 1, 1938 |
| 2,184,490 | Enkur et al. | Dec. 26, 1939 |
| 2,311,707 | Stewart | Feb. 23, 1943 |
| 2,330,726 | McKinnis | Sept. 28, 1943 |
| 2,357,826 | Hohl | Sept. 12, 1944 |
| 2,369,762 | Stewart et al. | Feb. 20, 1945 |
| 2,408,447 | Rau | Oct. 1, 1946 |
| 2,439,773 | Hohl et al. | Apr. 13, 1948 |
| 2,620,112 | Hohl et al. | Dec. 2, 1952 |
| 2,628,757 | Brown et al. | Feb. 17, 1953 |
| 2,630,957 | Hohl et al. | Mar. 10, 1953 |
| 2,630,958 | Hohl | Mar. 10, 1953 |